United States Patent [19]

Hsieh

[11] Patent Number: 5,925,126

[45] Date of Patent: Jul. 20, 1999

[54] METHOD FOR SECURITY SHIELD IMPLEMENTATION IN COMPUTER SYSTEM'S SOFTWARE

[75] Inventor: Vincent Hsieh, Cupertino, Calif.

[73] Assignee: Memco Software, Ltd., New York, N.Y.

[21] Appl. No.: 08/820,290

[22] Filed: Mar. 18, 1997

[51] Int. Cl.⁶ ................................................. G06F 13/00
[52] U.S. Cl. ........................................... 713/200; 713/201
[58] Field of Search ............................. 395/186, 187.01, 395/183.15; 380/23, 4

[56] References Cited

U.S. PATENT DOCUMENTS

| | | | |
|---|---|---|---|
| 5,369,707 | 11/1994 | Follendore, III | 380/25 |
| 5,579,478 | 11/1996 | Heiserman et al. | 395/186 |
| 5,689,638 | 11/1997 | Sadovsky | 395/188.01 |
| 5,774,650 | 6/1998 | Chapman et al. | 395/186 |
| 5,797,128 | 8/1998 | Birnbaum | 707/5 |
| 5,802,276 | 9/1998 | Benantar et al. | 395/186 |

*Primary Examiner*—Robert W. Beausoliel, Jr.
*Assistant Examiner*—Norman Michael Wright
*Attorney, Agent, or Firm*—Jeffrey A. Hall

[57] ABSTRACT

A security shield implementation method comprising computer software for use with a computer system's software which is transparent to the user of the computer system software and utilizes the steps of system call interception and interactive command interception to control access by a user of the computer system software. The system call interception for non-interactive commands, file access, programs, networks, and the interactive commands, such as access to interactive programs, are routed and examined by redirector software. Security rule checks and log event functions are then conducted on the non-interactive commands, file access requests, programs, networks, and the interactive commands. If a non-interactive command, file access request, program, network, or an interactive command is approved, the command request is then forwarded to the computer operating system.

18 Claims, 4 Drawing Sheets

METHOD FOR SECURITY SHIELD IMPLEMENTATION IN COMPUTER SYSTEM'S SOFTWARE

BACKGROUND OF THE INVENTION

1. Field of Invention

This invention relates to security systems and methods for computer system software, and more particularly to security shields for computer system's software and methods for implementing such security shields.

2. Description of the Related Art

The present invention provides a software technology and methodology to implement security shields and enhance security capabilities for open systems such as UNIX and NT. Disclosed are software event interception methods for implementing security access control and security monitoring that is non-circumventable and does not require modification of the operating system (OS) and system commands, and which is transparent to the user. The disclosure also describes a unique security language to implement simple but configurable Global Default Protection that is easily implemented on networked systems with significantly reduced administration and costs.

Heretofore, various security systems for computer system software have been proposed and implemented. However, security systems and methods have been limited by significant drawbacks. It is generally agreed in the computer industry that the challenge to computer security lies in both a lack of functional capabilities and in the inability to fully implement the security solutions and methods. A partially implemented security plan is as weak as the weakest point in the entire security system.

Some security systems are provided with point solutions for specific security problems, however, these solutions typically do not have a full set of features and functionality. For example, authentication is only one component of security, and for a security system to be complete it should be accompanied by granular authorization, policy management, and full monitoring and audit reporting.

Other current software security products are ported from other operating system environments or merged together through acquisition. For example, though such approaches to security used in mainframe computers are very effective, using the same approach in a UNIX client/server environment requires addressing issues that are specific to UNIX. By porting security products to UNIX, vendors frequently attempt to implement capabilities that are incomplete for the new operating systems environment. In addition, by combining various products and attempting to integrate them, vendors are faced with complex architectural differences. Frequently, these differences leave the system vulnerable due to lack of integration, limited administrative capabilities, or inadequate security.

Still other approaches use methodologies that are simply too complex to be fully implemented or too costly to manage. These solutions, by necessity, must be complicated in order to secure and protect all distributed computing resources. By way of comparison, the software of the present invention provides a methodology where the scope of the problem is simplified, where prior security methods and products apply complex solutions in an attempt to secure the Superuser. By definition, complexity increases the likelihood of operator error, and increases the inability to validate implemented policies against written policies, and with a concomitantly high administrative cost.

Such prior systems and methods have resulted in extremely high costs to users to evaluate, standardize, purchase, implement, administer, and upgrade. For an enterprise that is seeking end-to-end integrated solutions, the total cost of ownership is a crucial factor. Since such systems and methods offer limited functionality, lack integration, and are very complex to set up and administer, improved solutions and methodologies are clearly needed. Furthermore, such limitations often lead to poor implementation, leaving the system vulnerable and resulting in losses far in excess of the cost of the product.

For example, Dynasoft Inc.'s, BOKS security system provides one level of security control, namely user authentication. BOKS does not provide resource level access control for file and application access. The present invention, however, provides two levels of security, authentication and authorization. Once a user has logged in (authenticated) using the present method, their access is verified (authorized) against the security policy so that only they are able to access the resources for which they have been given permission. This greatly minimizes the destructive activities that an "authorized" user can engage in after they have been logged in.

Another example is memco, Inc.'s SeOS. This methodology is very complicated both to implement and to maintain. Such complexity results primarily from the presence of the Superuser, and SeOS's use of access control lists (ACL) as the principal access control mechanism. The SeOS method retains the user of the Superuser and then attempt to control Superuser access. SeOS protects login access from consoles and terminals, leaving the system vulnerable to attacks from other alternate access paths. The present invention, in contrast, protects access from all alternative access paths and eliminates Superuser access. The computer system is protected because no "backdoor" access exists and no user can assume Superuser control. Moreover, SeOS's architecture makes it difficult to verify a corporate security policy against the SeOS implementation. This results from the presence of the Superuser and access control being provided at the system resource level using ACL's, a bottom up approach. The present invention provides a methodology that insures that resource protection is defined at the user level, a top down approach. Accordingly, using the method of the present invention written corporate security policy can be easily implemented and verified, simplifying centralized security administration, easily meeting audit requirements quickly, and is both secure and easy to manage at a lower cost.

A further example of security systems and methods is Axent, Inc.'s Omniguard. The Omniguard system relies on system access control, security assessment, audit, monitoring, and root privilege delegation capabilities. However, OmniGuard also uses the Superuser and all of the abovementioned vulnerabilities and limitations exist. Furthermore, OmniGuard does not provide access control to files leaving data vulnerable to attack and misuse.

Prior methods to implement security enhancements to an existing computer system have utilized one or a combination of the following approaches to implement security: 1) The development of a new more secure operating system, which is very expensive to both the product developers and the users. For example, the Secure OS from Hewlett Packard, Corp., which uses a government B1 security standard, which is a total rewrite of the OS. 2) The addition of security-related services that require customized changes to the existing OS. Such services include system libraries, new system commands and system configuration files. This approach alters the underlying OS and the interactions with the users, it also involves customized solutions and security management procedures for different computer an operating system.

Accordingly, the primary objects of this invention are to provide a security shield and security methodology for computer system software which adds increased security to existing computer systems and their operating systems, and which is implemented without requiring changes to the software, either source code or binary code of the underlying operating system; which does not require users to change their normal interaction with the computer system and the operating system; which is simple to implement and manage; which has a small operational overhead; which has a uniform implementation approach for different and/or heterogeneous systems; and which is extremely efficient and reliable.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

The present invention provides a very efficient and cost effective method for adding security to computer software systems such as UNIX operating systems from Hewlett Packard, Inc., IBM, Inc., Digital, Inc. and Silicon Graphics, Inc., as well as other computer system software. The present invention discloses software which allows for the methodology described to be implem ente d in a manner transparent to the users and achieved without direct modification of the underlying operating syste m and environment. The method of the present invention provides security shields which ar e not easily removed or modified and can therefore be relied upon and trusted. The present security methodology is comprehensive and simple to implement and manage resulting in significant cost advantages over all prior systems and methods.

The present invention uses software methodology to place a security shield in front of any computer system software by placing controls and monitors in front of all access paths to the computer system software. The present invention utilizes computer software to implement a method software call interception technique to provide a simple yet secure method to place controls and monitors in access paths of computer system resources. The present methodology protects and monitors access to resources such as files, directories, programs, operator commands, systems and network services, all without modifying the operating system or system binaries. The two call interception techniques provide controls for both operating system requests, such as UNIX system calls, and interactive commands, such as telnet, rsh, and ftp. The present method provides a security methodology for open systems that is transparent to the users and is done without direct modification to the underlying operating system and environment, while providing adequate security, which is difficult to remove, and which is comprehensive and simple to implement and manage.

To achieve the foregoing objects, and in accordance with the purpose of the invention as embodied and broadly described herein, a security shield implementation method for computer system software which is transparent to the user of the computer system software is provided comprising the steps of system call interception and interactive command interception from a user of the computer system software. System call interception, for protection of non-interactive commands, file access requests, program access requests, networks, and the like, and interactive command interception for controlling access to interactive programs, are routed and examined by redirector software. Security rule checks and log event functions are then conducted on the non-interactive commands, file access requests, program access requests and the like, and on the interactive commands. If a non-interactive command or file access request, for example, or an interactive command is approved, the command request is then forwarded to the computer operating system.

There is also provided, in accordance with the invention a method for security shield implementation in computer system software for protection of the computer system software from unauthorized access by a user, comprising: means for controlling access to files of the computer system software by redirector means for intercepting a non-interactive command request from a computer system user prior to forwarding the request to the operating system software, performing a rule check and a log event function using operating system call interception, returning a failed rule check request to the computer system user, and forwarding approved requests for continued processing to the operating system. Means for controlling access to interactive programs by redirector means for intercepting an interactive command from a user and returning failed rule check interactive commands to the user and to continue processing succeeded rule check interactive commands are provided. Then the interactive or the non-interactive commands are forwarded for processing by the operating system software.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Figure 1:
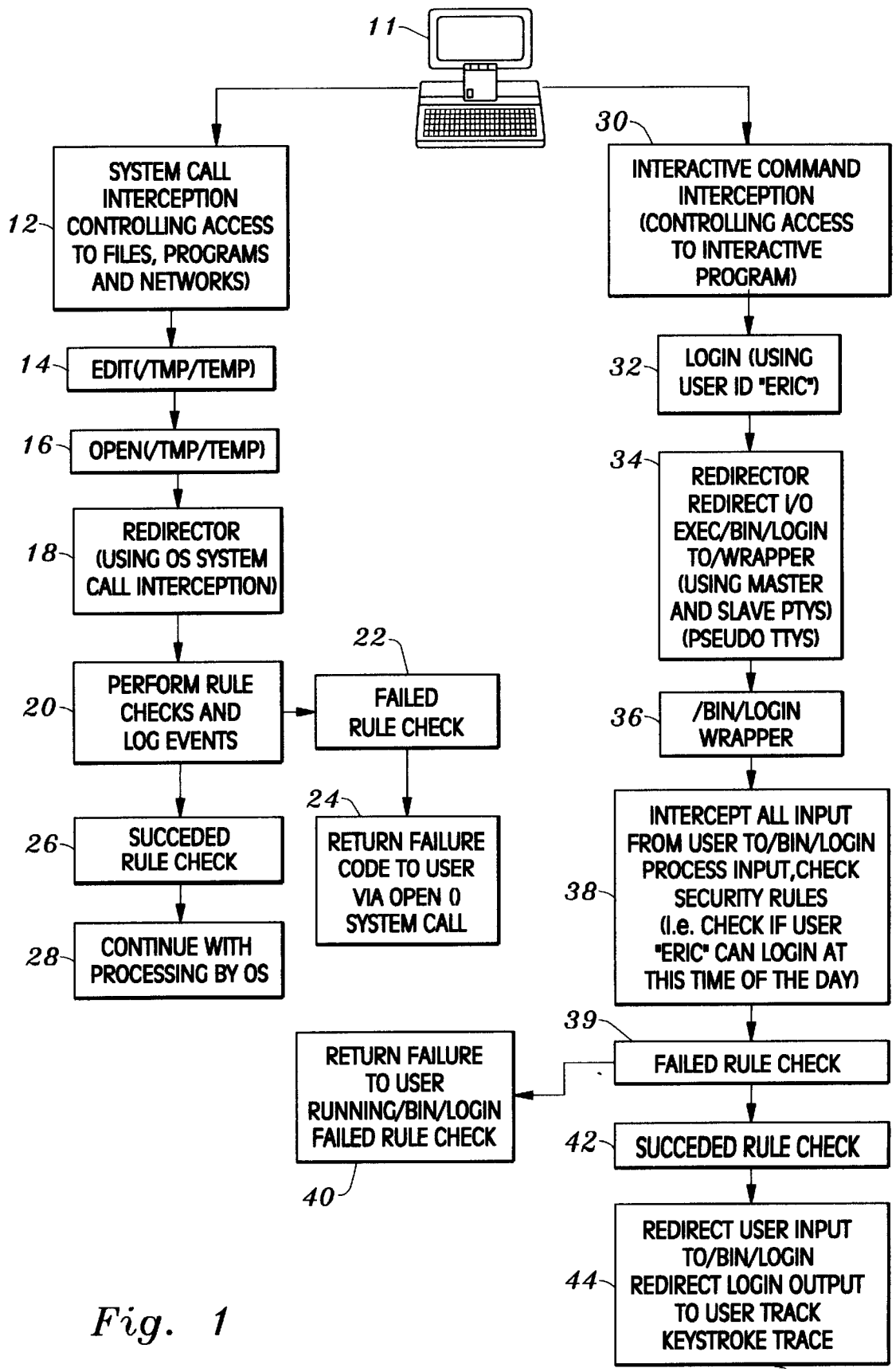
FIG. 1 is a flow chart of the preferred methodology for implementing a security shield for computer system software, according to the invention.

Reference will now be made in detail to the present preferred embodiments of the invention as illustrated in the accompanying drawings.

The present invention provides an efficient, secure, user transparent, method for implementing a security shield for any computer system software. It is provided as a fully integrated intranet security software that applies the quality of mainframe security to heterogeneous UNIX and Windows NT systems, as well as other computer software systems. The present methodology protects files, directories, programs, operator commands, systems, and network services, all without modifying the operating system. It achieves this by addressing a variety of UNIX and other systems operating security weaknesses, for example, the presence of the Superuser account. The present invention provides the integration of advanced security functionality including centralized enterprise-wide security management, authorization service for granular resource sharing and access control, default protection, and delegation of administrative privileges. The present methodology accomplishes this by providing a sophisticated, simple to administer security that substantially reduces the costs associated with such protection when compared to all prior systems and methods.

In accordance with the present invention, there is provided a security shield implementation method for computer system software which is transparent to the user of the computer system software comprising the steps of system call interception and interactive command interception of access requests and commands from a user of the computer system software. The system call interception techniques are used, for example, for securing non-interactive commands, file access, programs, program access requests, networks, and the like; and the interactive command interception techniques are used for controlling access to interactive programs, and such requests and commands are routed and examined by redirector software. Security rule checks and log event functions are then conducted on the non-interactive commands and the interactive commands. If a non-interactive command or an interactive command is approved the command request is then forwarded to the computer operating system.

There is also provided, in accordance with the invention method for security shield implementation in computer system software for protection of the computer system software from unauthorized access by a user. Preferably the method comprises means for controlling access to files of the computer system software by redirector means for intercepting a non-interactive command requests, file access requests, program access request, network, and the like, from a computer system user prior to forwarding the request to the operating system software, performing a rule check and a log event function using operating system call interception, returning a failed rule check request to the computer system user via open system call, and forwarding approved requests for continued processing to the operating system. Means for controlling access to interactive programs by redirector means for intercepting an interactive command from a user and returning failed rule check interactive commands to the user and to continue processing succeeded rule check interactive commands are provided. Then, the interactive commands or the non-interactive commands, file access requests, programs, networks, and the like, are forwarded for processing by the operating system software.

In FIG. 1, the security shield methodology 10 for computer system software of the present invention is shown according to a preferred embodiment of the invention. Preferably means for system call interception, utilized for controlling access to files, non-interactive commands, programs, networks, and the like, from a user of the computer system is achieved by system call interception 12 including the following sequence of steps: edit 14 (/tmp/temp), open 16 (/tmp/temp), and redirect the request via redirector 18. Redirector 18 is software which intercepts requests or commands from users and redirects the request to software means for examination and rule check as described below. Next the request is examined by performing rule checks and log events 20. If the rule checks for this particular application are failed 40, then the request is returned 24 by failure code to the user via open system call. If the request succeeds or passes the rule check 20 it is forwarded for further processing 28 of the request by the operating system.

Means for intercepting interactive commands such as access to interactive programs, is preferably achieved using interactive command interception 30, which controls access to interactive programs of the host software and other interactive programs. As seen in FIG. 1, interactive command interception 30 preferably comprises the steps of login 32, shown, for example, using user id "eric". The command is then routed to redirector 34 and the command then shunted to redirect exec and to login wrapper 36. All command inputs from the user to /bin/login are processed and checked 38 according to security rule checks such as check if user "eric" can login at this time of the day, and if the input is successful at passing the rule check, the succeeded rule check command 42 then is processed to redirect user input 44 to /bin/login, and the login output is redirected to the user using track keystroke trace for further processing. If the rule check is failed 39, then it is returned to user 40.

Figure 2:
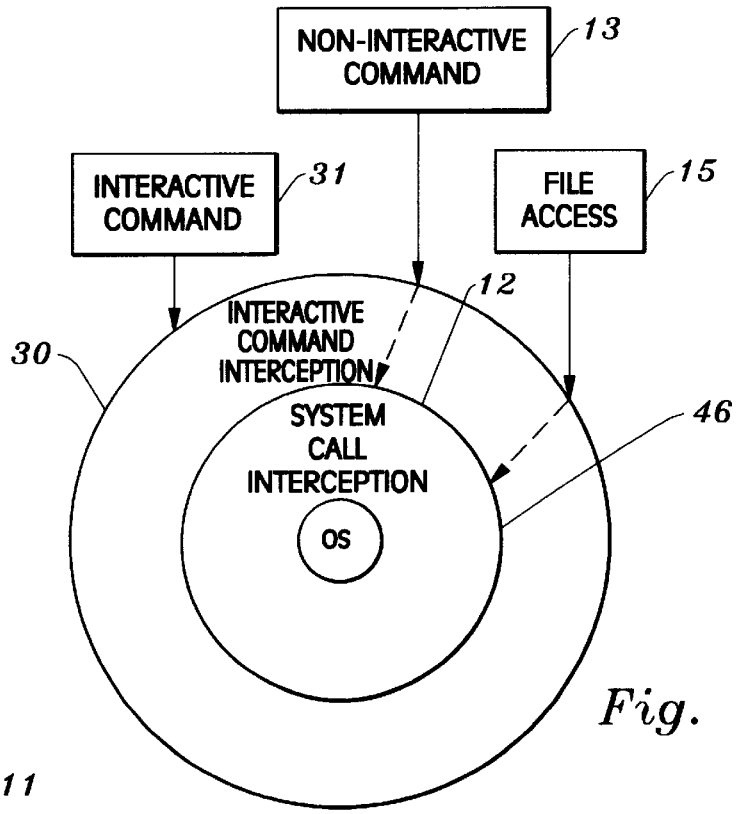
FIG. 2 is a schematic representation of the command interception and system call interception methodology utilized to secure computer system software, according to the invention.

With reference now to FIG. 2, a schematic representation of the preferred method of the present invention is shown where program access is represented by concentric circles and operating system 46 is shielded by concentric rings representing system call interception 12 for screening non-interactive commands 13 and file access 15, for example, and interactive command interception 30 for screening interactive commands 31. By combining both system call interception 12 and command interception 30, the present methodology provides Global Default Protection means and is an elegant and reliable means for implementing security shields for protection of any computer system software.

Figure 3:
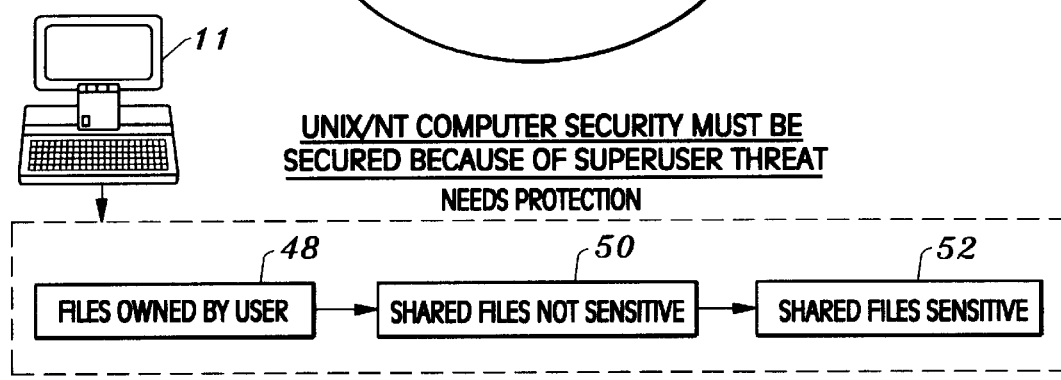
FIG. 3 is a schematic representation illustrating the problem of security in UNIX/NT operating systems, according to the invention.

For example, in both UNIX and NT systems, a "Superuser" power program overrides all other system protections. The "Superuser" was designed to give one class of user absolute control over system administration activities and, in large organizations, this capability is typically assigned to many people. Superusers may remove any or all access controls, violate security policies, view and change any file, read anyone's e-mail, and remove passwords. Security in such software systems becomes an exponentially complex and expensive task in the presence of Superuser because all resources must be secured, monitored, and controlled against inadvertent Superuser attacks, as seen in FIG. 3. In addition to files 48 owned by the user, shared files 50 which are not sensitive, and shared files 52 which are sensitive, programs. operator commands, systems and network services are all vulnerable to Superuser threat and, therefore, must be protected.

In a UNIX system, for example, all access paths to system resources must be addressed to completely secure the UNIX system. Using the login access to systems as an example, other than via the system console terminal, can be achieved through many paths such as telnet, rlogin, rsh, X Window based login, XDM login, CDE login, and HP VUE login. However protecting the absolute file path, i.e. /a/b/temp, does not provide complete protection because alternative access through relative paths and symbolic links exist. Protecting against alternative access paths is especially important in the context of Superuser access as described. The present methodology provides complete protection for alternative access paths to resources without modifying the operating system code or system commands by using both system call interception and command call interception as disclosed.

The present methodology, in the preferred embodiment, reduces the complexity of the security problem of UNIX and NT by eliminating Superuser access and implementing Least Privilege (granular privilege access control) methodology which insures that all data and resources are available to personnel only on a need-to-know basis. In this manner, damage from malicious attack is minimized and contained. Without the present methodology, the implementation of Least Privilege for distributed computing does not occur due to the presence of the Superuser account which has all system privileges.

The methodology of the present invention differentiates it from prior security products and methods by its ability to enable simple security management by effectively utilizing Least Privilege techniques, Default Protection techniques, and Role-base Access.

Figure 4:
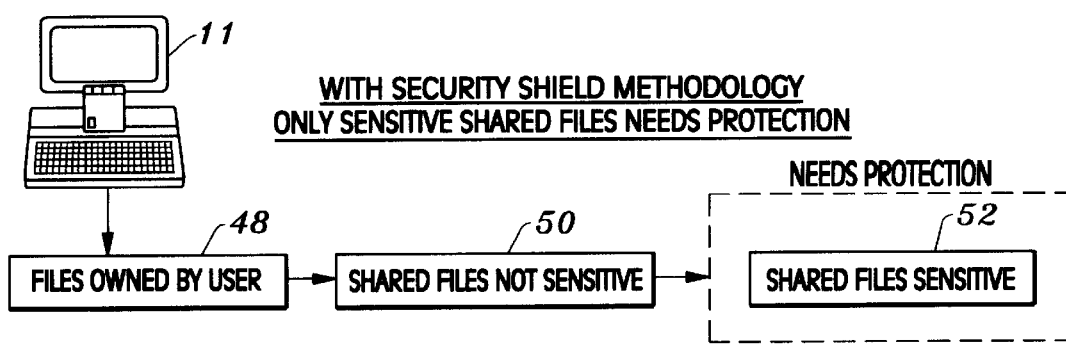
FIG. 4 is a schematic representation of the method of the present where the complex security problems are simplified by implementing least privilege methodology, according to the invention.

The present methodology uses Least Privilege so that each user and each program operates using the fewest privileges possible, and all users access resources on a need-to-know basis. The preferred methodology eliminates Superuser access while retaining system operations that require administrative privilege. The method, in effect, replaces the Superuser with the Administrative Privilege Delegation (APD) module. This allows administrative tasks to be delegated to administrative user and non-secure administrative tasks to be delegated to end-users. With the Least Privilege, the present methodology only needs to explicitly protect shared, sensitive resources as shown in FIG. 4. With the present methodology, files 48 owned by user, and files 50 which are not sensitive files are not explicitly protected, while shared files which are sensitive 52 are protected. Such implementation of a Least Privilege based methodology is not possible without the present method due to the presence of the Superuser.

Figure 5:
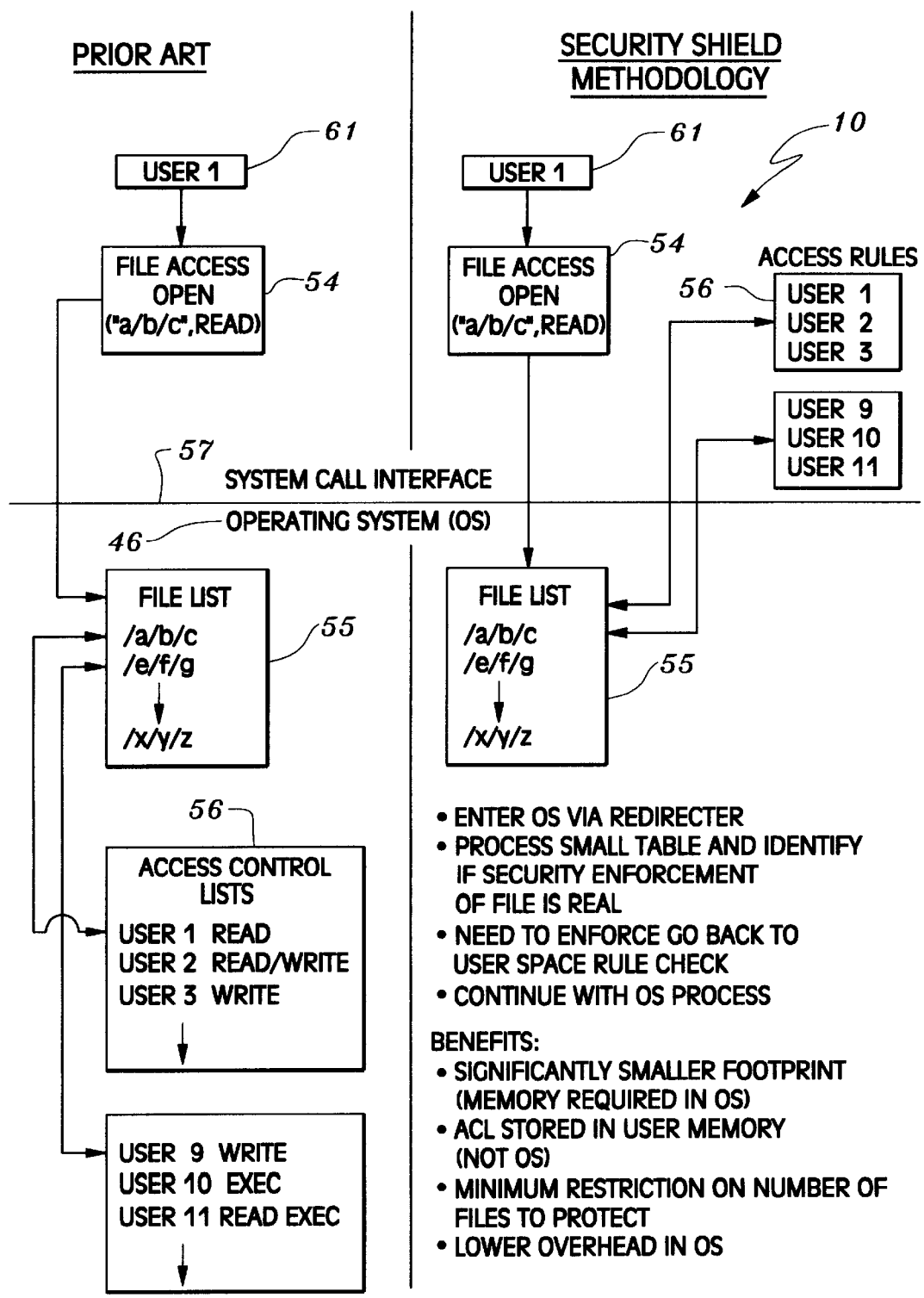
FIG. 5 is a schematic comparison of prior art security system file access protection compared with the security shield methodology of the present invention, according to the invention.

Referring now to FIG. 5, the security shield methodology of the present invention is shown in relation to prior file access protection methods. The user, in prior methods, requests to open 54 the file, and the request proceeds to a file list 55 and access rules 56 with access control lists (ACL's). The system call interface 57 shown is used as a filter for commands to operating system (OS) 46. In contrast, the security shield methodology of the present invention provides file access protection in a far simpler manner, where a request or command for file access is directed to a file list 55, intercepted by system call interface 57 and directed to access rules 56. The request or command is intercepted and redirected via redirector and the request is then examined. If security is to be enforced on the file, the request or command is sent back to user space. If no security is to be enforced the request or command continues to the operating system for further processing. The present method accordingly uses a significantly smaller footprint or memory required in the operating system as the access control list are stored in user memory not in the operating system. This allows for protection of a greater number of files as compared to prior methods and systems and is achieved without direct modification of the operating system.

Figure 6:
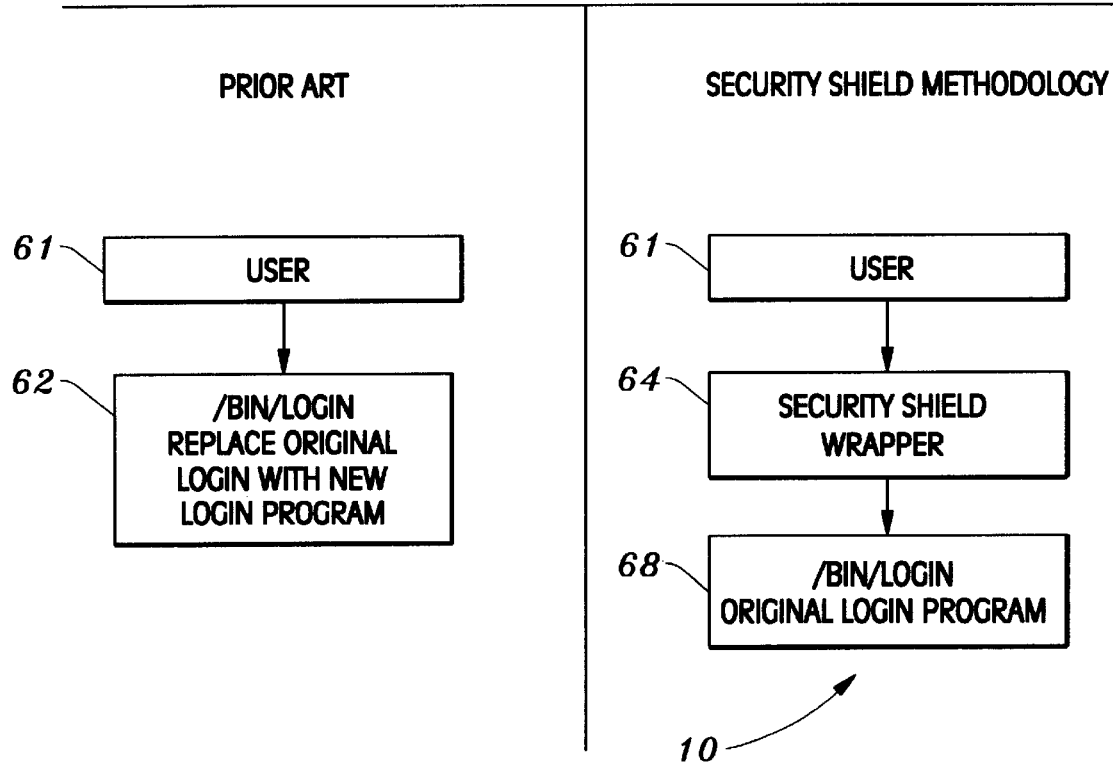
FIG. 6 is a schematic comparison of prior art security system application (AP) program protection compared with the security shield methodology of the present invention, according to the invention.

In FIG. 6, a schematic comparison of security protection for interactive programs for prior methods and the security shield methodology of the present invention is shown. In prior methods the user 61 requests access to a program where the original login program has been replaced by new login program 62 /bin/login. The security shield methodology 10 of the present invention is shown where for interactive program access the user 61 requests or commands are directed to security shield wrapper 64 and then if approved, to the original login program 68 /bin/login.

Figure 7:
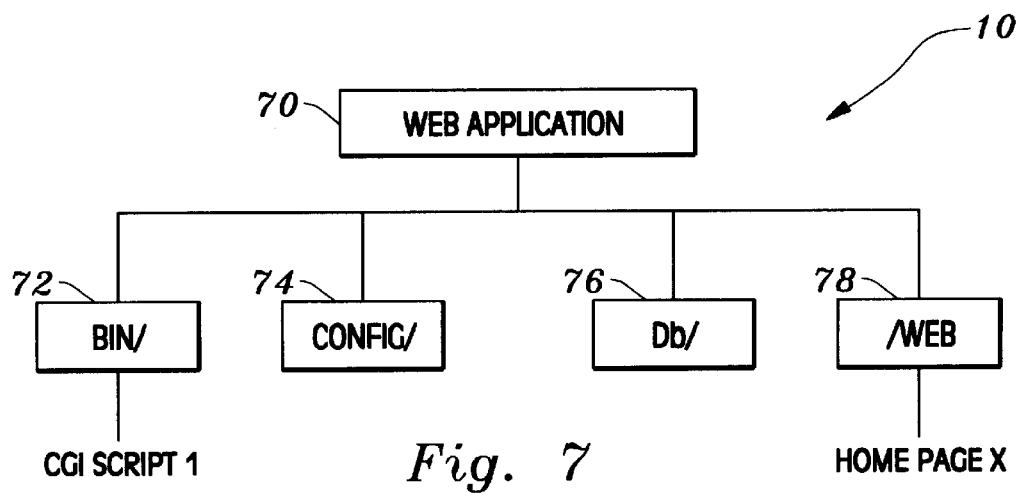
FIG. 7 is a diagrammatic representation of a file directory hierarchy of a web server for protection by the security shield methodology using file access control, according to the invention.

The present methodology is also very useful for internet and intranet security applications. The present method provides a file access control module by which web servers, data base servers, NFS and file servers can be protected. The file access module contains or compartmentalizes access so that any access using a CGI or Java script is restricted through the use of an access control path. For example, in such an application environment, where users and resource objects, including applications and files, such as configuration files, data bases and web pages require protection. As seen in FIG. 7, a file directory hierarchy of a web server is shown. Web application 70 is shown operably linked to Bin/ 72 which is the directory containing all the applications, such as CGI and Java scripts. Config/ 74 is the directory containing all the configuration files used by the applications. Db/ 76, is the directory containing all database files used by the applications, and /Web 78 is the directory containing all of the web pages.

In addition to the file access control module described, the present method also allows for the implementation of a centralized enterprise security system in heterogeneous environments. The present method may be utilized in such applications by a phase implementation which is both cost effective and very reliable because of the modular security means provided. Such means preferably comprise an enterprise security administrator (ESA) module which provides a base-line authentication and authorization of security functions such as centralized password management; access control to systems, access control to networks, and real-time security event monitoring and notifications.

A file access control module (FAC) is provided, preferably for the engine and administrative interfaces to authorize access and sharing of files. FAC preferably includes the capability to implement a trusted path from the users to the intended file resources by way of restricting that access through specific applications. This trusted path is termed and access control path (ACP) and provides means for performing a rule check function for file access by restricting access through a specific application program. In addition, all file access may be selectively audited and monitored centrally. FAC provides effective protections for sensitive data and critical applications residing on servers including web serves, file servers, and database servers.

By using the security methodology of the present invention with a file access module, a web server many set up secure access paths for CGI and Java scripts. All CGI scripts under directory, for example, /web/netscape.server/cgi* has access "only" to files under directory /web/db/*. Without the use of the present method, a web user may access the web server application and then have access to related files, databases and any other files on the server, not under the web application directory. The present method, however, allows access to be restricted in CGI and Java scripts to just the web files and databases.

Other modules comprise an administrative privilege delegation (APD) module which delegates a subset of administrative powers of a Superuser account or other privileged user capabilities to specific administrative users without giving away full root power, nor disclosing the root password. ADP provides a centralized configuration management of administrative/operator command privileges for an entire network. It also provides audit log of all privileged user activities throughout the network.

An advance security monitor (ASM) module for audits and monitors of selective operation system events may be configured to audit an monitor selected activities based on users, processes, programs, and targeted files on designated systems. For example, ASM can be used to monitor all privileged access from Superusers and "setuid root" programs and processes, or to monitor all accesses to a sensitive file or program.

A single sign-on (SSO) module may be utilized for providing a secured single user authentication and identification for multiple applications running across multiple platforms, for example Windows NT, UNIX, Novell and mainframe environments. SSO eliminates the need for a user to provide a different user identification and password when signing on to different applications and platforms. SSO also provides a solution to the problem of password spoofing on the network by eliminating the need to transmit passwords over the network.

In operation and use the present methodology also provides a unique method of default protection to enable corporate wide control over security. By implementing the present methodology a corporate security administrator does not have to explicitly define access policies for most of the users on an individual basis, but rather only by exception. This greatly simplifies the process of designing, implementing, and verifying security policies. The present method allows for enterprise-wide default protection at the system level, the network level, and at the file and directory level using the system call interception and command call interception techniques previously described. Furthermore, any new files or directories added to the system are protected by default, that is, there is no need to explicitly protect them. User are permitted to access to system resources owned only by themselves, including directories, files, scripts, and programs under their home directory. Users are denied access to shared resources by default. However, systems using Superuser access cannot provide automatic file and directory level default protection because any newly created file, program or directory is subject to Superuser attack and accordingly must be explicitly protected.

The preferred methodology of the present invention also utilizes Role-based Access Control to simplify resource sharing. After implementing Least Privilege and Default Protection, users can be explicitly granted access to shared resources as defined by their job responsibilities. Both users and resources objects are preferably defined using "user roles", for example, engineering; marketing; and finance, and "resource object roles", for example, all application programs used by the funds transfer department; all configuration files for processing credit card applications; and all machines in subnet 129.131. Access rules are preferably specified with roles such as "All bank managers can read configuration files for processing credit card applications", as opposed to rules specified by an individual user or resource. Instead of requiring a user to assign the same authority to each user or resource in a group, the software of the present invention allows the same authority to be assigned to the group all at one. Such Role-base methodology further simplifies the scope, cost, and management of access control.

As is evident from the above description, the methodology of the present invention is an elegant, cost effective, and very reliable means to provide a security shield and security methodology for computer system software. The present methodology adds increased security to existing computer systems and their operating systems, and is implemented without requiring changes to the software, either source code or binary code of the underlying operating system. The present methodology is transparent to the users and does not require users to change their normal interaction with the computer system and the operating system. Moreover, the present methodology is simple to implement and manage and has a small operational overhead, is uniformly implemented for different and/or heterogeneous systems, and is extremely efficient and reliable.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. Computer software for a security implementation method for computer system software, said computer software being stored on a computer readable medium, said medium being executed on said computer system, comprising:

means for system call interception for intercepting non-interactive commands, file access commands, program access requests, and network access commands from a user of said computer system software;

means for intercepting interactive commands from said user of said computer systems software;

examination means for examining said non-interactive commands and said interactive commands from the user of said computer system software;

means for performing a rule check functions of said non-interactive commands and said interactive commands from the user of said computer system software;

means for implementing log in functions of said non-interactive and said interactive commands from the user of the computer system software; and, means for forwarding accepted said non-interactive commands, file access commands, program access requests, network access commands, and said interactive commands to the operating system of said computer system software.

2. The computer software of claim 1, wherein said means for system call interception comprises a redirector means.

3. The computer software of claim 1, wherein said means for intercepting interactive commands form said user of said computer system software comprises a redirector means.

4. The computer software of claim 1, wherein a means for controlling access to an interactive program in said computer system software comprises interactive command interception means.

5. The computer software of claim 1, wherein said method is utilized for internet software application protection by file access control means.

6. A method for security shield implementation in computer system software for protection of the computer system software from unauthorized access by a user, comprising:

step for controlling access to files of said computer system software by redirector means for intercepting a non-interactive command request from a computer system user prior to forwarding to an operating system software, performing a rule check and a log event function using operating system call interception, returning a failed rule check to said computer system user via open system call, and forwarding for continued processing succeeded rule check requests to said operating system;

step for controlling access to interactive programs by redirector means for intercepting an interactive command from a user and returning failed rule check interactive commands to said user and to continue processing succeeded rule check interactive commands;

forwarding accepted said interactive or said non-interactive commands for processing by the operating system software.

7. The method for security shield implementation in computer system software for protection of the computer system software from unauthorized access by a user of claim 6, wherein said step for controlling access to files of said computer system software comprises redirecting file "open" system calls to said redirector means for examination and processing.

8. The method for security shield implementation in computer system software for protection of the computer system software from unauthorized access by a user of claim 6, wherein said step for controlling access to files of said computer system software comprises redirecting file "exc" system calls to said redirector means for examination and processing.

9. The method for security shield implementation in computer system software for protection of the computer system software from unauthorized access by a user of claim 6, wherein said non-interactive command controls access to said files of said computer system software.

10. The method for security shield implementation in computer system software for protection of the computer system software from unauthorized access by a user of claim 6, wherein said non-interactive command controls access to a program of said computer system software.

11. The method for security shield implementation in computer system software for protection of the computer system software from unauthorized access by a user of claim 6, wherein said redirector means for intercepting said requests for said computer system user comprises redirecting interactive commands via a command interception and returning a failed rule check command to said user.

12. The method for security shield implementation in computer system software for protection of the computer system software from unauthorized access by a user of claim 6, wherein said redirector means for intercepting said requests for said computer system user comprises redirecting interactive commands via a command interception and processing said interactive command if said users access is approved by passing said rule check.

13. The method for security shield implementation in computer system software for protection of the computer system software from unauthorized access by a user of claim 6, wherein said step for controlling access to said interactive programs in said computer system software utilizes a small foot print of memory in said operating system.

14. The method for security shield implementation in computer system software for protection of the computer system software from unauthorized access by a user of claim 6, wherein an access control list is stored in a user's computer systems memory.

15. The method for security shield implementation in computer system software for protection of the computer system software from unauthorized access by a user of claim 6, wherein said step for controlling access to files of said computer system software and said means for controlling access to interactive programs in said computer system call interception means and command interception means, whereby a large number of files of said computer software system are protected.

16. The method for security shield implementation in computer system software for protection of the computer system software from unauthorized access by a user of claim 6, wherein said method is utilized in a UNIX operating system.

17. The method for security shield implementation in computer system software for protection of the computer system software from unauthorized access by a user of claim 6, wherein said method is utilized to secure and protect webscripts file access control means.

18. The method for security shield implementation in computer system software for protection of the computer system software from unauthorized access by a user of claim 6, further including step for performing a rule check function for file access by restricting access through a specific application program.

* * * * *